United States Patent
Brusco (10) Patent No.: US 10,652,337 B2
(45) Date of Patent: May 12, 2020

(54) PASSENGER SIDE DISPLAY VIA A USER PORTABLE DEVICE

(71) Applicant: Thunder Power New Energy Vehicle Development Company Limited, Central (HK)

(72) Inventor: Massimiliano Brusco, Milan (IT)

(73) Assignee: Thundar Power New Energy Vehicle Developmont Company Limited, Central (HK)

( * ) Notice: Subject to any disclaimer, the term of this patent is extended or adjusted under 35 U.S.C. 154(b) by 0 days.

(21) Appl. No.: 15/685,272

(22) Filed: Aug. 24, 2017

(65) Prior Publication Data
US 2018/0069930 A1    Mar. 8, 2018

Related U.S. Application Data

(60) Provisional application No. 62/384,298, filed on Sep. 7, 2016.

(51) Int. Cl.
*H04L 29/08* (2006.01)
*H04M 9/00* (2006.01)
(Continued)

(52) U.S. Cl.
CPC ............ *H04L 67/125* (2013.01); *B60K 37/06* (2013.01); *H04L 67/12* (2013.01); *H04M 1/6083* (2013.01); *H04M 9/00* (2013.01); *H04W 4/80* (2018.02); *H04W 48/04* (2013.01); *B60K 2370/152* (2019.05); *B60K 2370/569* (2019.05); *B60K 2370/573* (2019.05); *B60K 2370/589* (2019.05); *H04M 1/6091* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2008/0162147 A1* | 7/2008 | Bauer | G06F 17/30026 704/275 |
| 2013/0066518 A1* | 3/2013 | Chen | G08C 17/02 701/36 |

(Continued)

FOREIGN PATENT DOCUMENTS

| | | |
|---|---|---|
| EP | 2 871 866 A1 | 5/2015 |
| WO | 2015/048307 A1 | 4/2015 |

OTHER PUBLICATIONS

Antti Aumo, MerrorLink and the Connected Car, CarConnectivity Consortium LLC, 2014.*
(Continued)

*Primary Examiner* — Zhitong Chen
(74) *Attorney, Agent, or Firm* — Kilpatrick Townsend & Stockton LLP (57) ABSTRACT

Embodiments can enable a passenger to connect his/her portable device, such as smart phone to a display positioned to be used by the passenger. After the passenger connects the portable device to the passenger display, the passenger may be enabled to control the portable device by providing inputs through the passenger display and/or the portable device. In some embodiments, the passenger may be enabled to control one or more in-vehicle devices through the portable device after it is connected to the passenger display.

16 Claims, 9 Drawing Sheets

(51) Int. Cl.
*B60K 37/06* (2006.01)
*H04M 1/60* (2006.01)
*H04W 4/80* (2018.01)
*H04W 48/04* (2009.01)
*H04W 84/18* (2009.01)

(52) U.S. Cl.
CPC .... *H04M 2250/02* (2013.01); *H04M 2250/16* (2013.01); *H04W 84/18* (2013.01)

(56) References Cited

U.S. PATENT DOCUMENTS

| | | |
|---|---|---|
| 2014/0107864 A1 | 4/2014 | Cecchini |
| 2015/0201023 A1* | 7/2015 | Kotab ................ H04L 65/60 |
| | | 709/208 |
| 2015/0210287 A1 | 7/2015 | Penilla et al. |
| 2015/0350416 A1 | 12/2015 | Fischer |
| 2016/0034238 A1* | 2/2016 | Gerlach ............. G06F 3/04817 |
| | | 345/1.1 |

OTHER PUBLICATIONS

European Search Report for EP 17 18 9796 dated Nov. 22, 2017, 10 pages.

* cited by examiner

PASSENGER SIDE DISPLAY VIA A USER PORTABLE DEVICE

REFERENCE TO RELATED APPLICATION

The present application is a nonprovisional of and claims priority to U.S. Provisional Application No. 62/384,298, filed Sep. 7, 2016, the entire contents of which are hereby incorporated by reference for all purposes.

BACKGROUND OF THE INVENTION

This invention generally relates to in-vehicle display through a user portable device.

The number and complexity of driver-controllable in-vehicle devices has grown rapidly in the last several years and is anticipated to further increase in the future. Such devices include audio systems, televisions, telephones, air conditioners, GPS, Internet browsers and other Internet or wireless communication-based systems. Many functions that are not directly manipulated by the driver, e.g. engine temperature, are displayed on a dashboard and are monitored by the driver and passenger(s) if necessary. The driver can choose actions in response to such displays. While some in-vehicle devices are positioned to be controllable by the passenger(s) such as in-vehicle climate control, most in-vehicle devices are usually designed and positioned to be used and controlled by the driver.

Developments in liquid crystal display (LCD) technology have made free-form display on a dashboard a reality. Equipped with the new free-form display technology, a dashboard screen can be snipped and shaped to fit virtually any layout design on a dashboard and to fill the entire surface area of the dashboard. The free-form display's flexibility makes it possible to provide suitable displays to passengers in a vehicle.

Technologies that enable a driver to connect his/her smart phone to a dashboard display have emerged to replace traditional pre-configured in-vehicle infotainment system. For example, Android Auto and Apple CarPlay allow the driver to connect his/her smart phone to use apps on the smart phone through the dashboard display. However, both Android Auto and Apple CarPlay are designed for the driver. Therefore, there is a need to enable a passenger to connect his/her smart phone to an in-vehicle passenger display to perform various functions suitable for the passenger.

BRIEF SUMMARY OF THE INVENTION

In one aspect, embodiments can enable a passenger to connect his/her portable device, such as smart phone to a display positioned to be used by the passenger (referred to as a "passenger display" herein). After the passenger connects the portable device to the passenger display, the passenger may be enabled to control the portable device by providing inputs through the passenger display and/or the portable device. In some embodiments, the passenger may be enabled to control one or more in-vehicle devices through the portable device after it is connected to the passenger display.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION OF THE INVENTION

Figure 1:
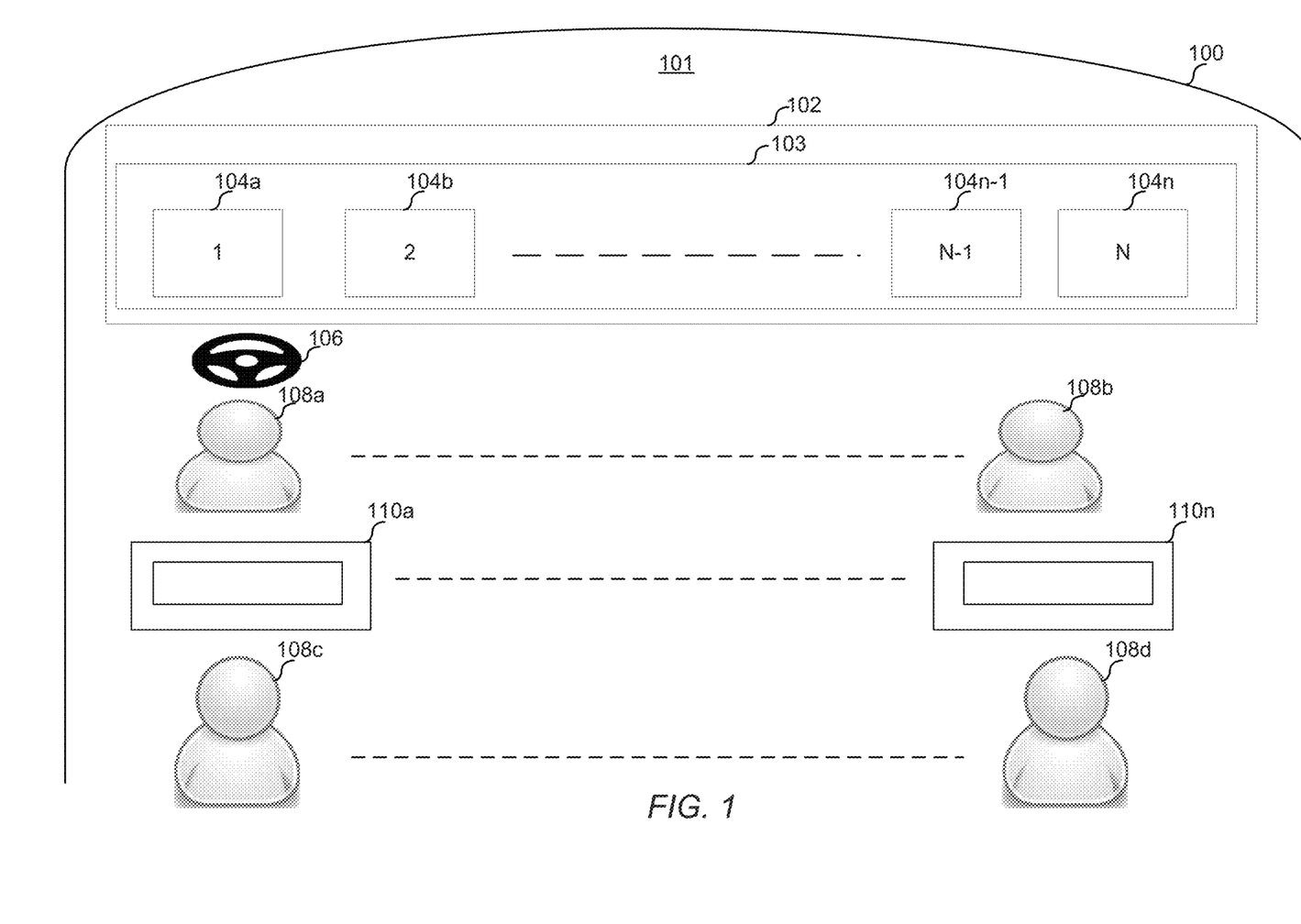
FIG. 1 generally illustrates a passenger is enabled to connect his/her portable device to a passenger display provided in a driving apparatus.

FIG. 1 generally illustrates an embodiment enabling a passenger to connect his/her portable device to a passenger display provided in a transportation apparatus 100. The transportation apparatus 100 may include any apparatus that moves in distance. Examples of transportation apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the transportation apparatus 100 is an electrical automobile. As shown, the transportation apparatus 100 may include a cabin 101 with a volume.

As shown in FIG. 1, in the cabin 101, there may be a dashboard 102 that has a screen 103. Although in this example, a dashboard screen 103 occupies the entire surface of the dashboard 102, this is not intended to be limiting. It is contemplated that in some cases, the dashboard screen 103 may occupy a portion of the dashboard 102 instead of the entire dashboard 102. In any case, the dashboard screen 103 is suitable to display one or more information panels, such as the information panels 104 shown in FIG. 1. In implementations, the dashboard screen 103 may include any display technology, such as liquid-crystal display (LCD), crystal LCD, light-emitting diode (LED), organic light-emitting diode (OLED), active-matrix organic light-emitting diode (AMOLED), Plasma, projection panel, cathode ray tube (CRT), and/or any other display technology. As also shown, the information panels 104 displayed on the dashboard screen 103 are separate and independent from each other such that the individual information panels 104 are displayed at corresponding positions on the dashboard screen 103. In this example, information panel 104a is displayed at position 1 on the dashboard screen 103, information panel 104b is displayed at position 2 on the dashboard screen 103, information panel 104n-1 is displayed at position N-1 on the dashboard screen 103, and information panel 104n is displayed at position N on the dashboard screen 103.

In some examples, information presented in the information panels 104 may include gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the information panels 104 may include indication information, such as seat belt, airbag, door, trunk, maintenance, safety, window lock, door lock indication information or any other indication information. In some examples, information presented in the information panels 104 may include navigational or GPS information related to navigation of the transportation apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the information panels 104 may include cabin information, such as current temperature, humidity, wind speed, number of passengers in one or more zones in the cabin 101 and/or any other cabin information. In some examples, information presented in the information panels 104 may include configuration information regarding the transportation apparatus 100, such as seat configuration, mirror configuration, battery configuration, driving mode configuration, and/or any other configuration. In some examples, information presented in the information panels 104 may include entertainment information. For example, such an information panel may include a video screen capable of presenting a video or still images, a browser screen capable of presenting web information, a game screen capable of presenting one or more games for user interaction, a music information screen capable of enabling a user to consume music pieces, e-commerce information screen capable of enabling a user to engage remote transaction via the Internet, radio information screen capable of presenting a list of radio stations available for user consumption, and/or any other type of infotainment screen. In some examples, information presented in the information panels 104 may include notification information such as incoming call, incoming text message, incoming video chat request, and/or any other notification information. Other examples of information panels 104 are contemplated.

As still shown in FIG. 1, the transportation apparatus 100 may comprise one or more steering wheels 106 in the cabin 101. Although only one steering wheel 106 is shown in FIG. 1, this is not intended to be limiting. In some examples, the transportation apparatus 100 may include more than one steering wheel 106. For example, it is contemplated that the transportation apparatus 100 may be an aircraft that comprises at least a main steering wheel 106 for the main pilot and at least a secondary steering wheel 106 for a co-pilot.

As also shown in FIG. 1, one or more users 108 may be arranged to occupy their corresponding positions in the cabin 101. The users 108 may include one or more drivers that control the movement and/or navigation of the transportation apparatus 100, one or more passengers, and/or any other type of users 108. In this example, the user 108a is a driver that controls the driving of the transportation apparatus 100, while other users 108, e.g., users 108b-d, are passengers. As still shown, there may be multiple rows of users 108 within the cabin 101 of the transportation apparatus 100.

As shown, in a row where the passengers 108b-d are located in the cabin 101, multiple passenger displays, such as displays 110a and 110n, may be provided for the passengers. In some embodiments, as shown in this example, each passenger in the row may be provided a passenger display mounted on a back panel of a seat in front of the passenger. In this example, the passenger display 110a is provided to passenger 108c, and the display 110n is provided to the passenger 108d. A given passenger display 110 provided in the cabin 101 may include a LCD screen similar to the one fitted on the dashboard as described above. As described herein, the given passenger display 110 may be connected to a user portable device associated with a passenger. For example, the passenger display 110a may be connected to a portable device associated with passenger 108c, and the passenger display 110n may be connected to a portable device associated with passenger 108d.

Figure 2A:
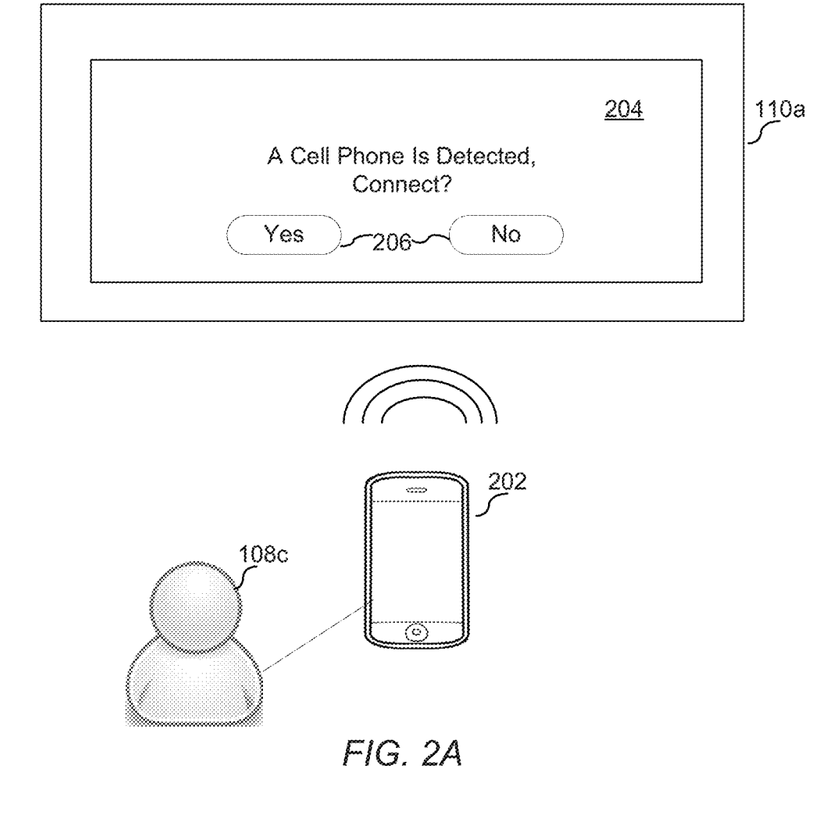
FIG. 2A illustrates a user portable device associated with a passenger of the may be connected with the passenger display wirelessly.
Figure 2B:
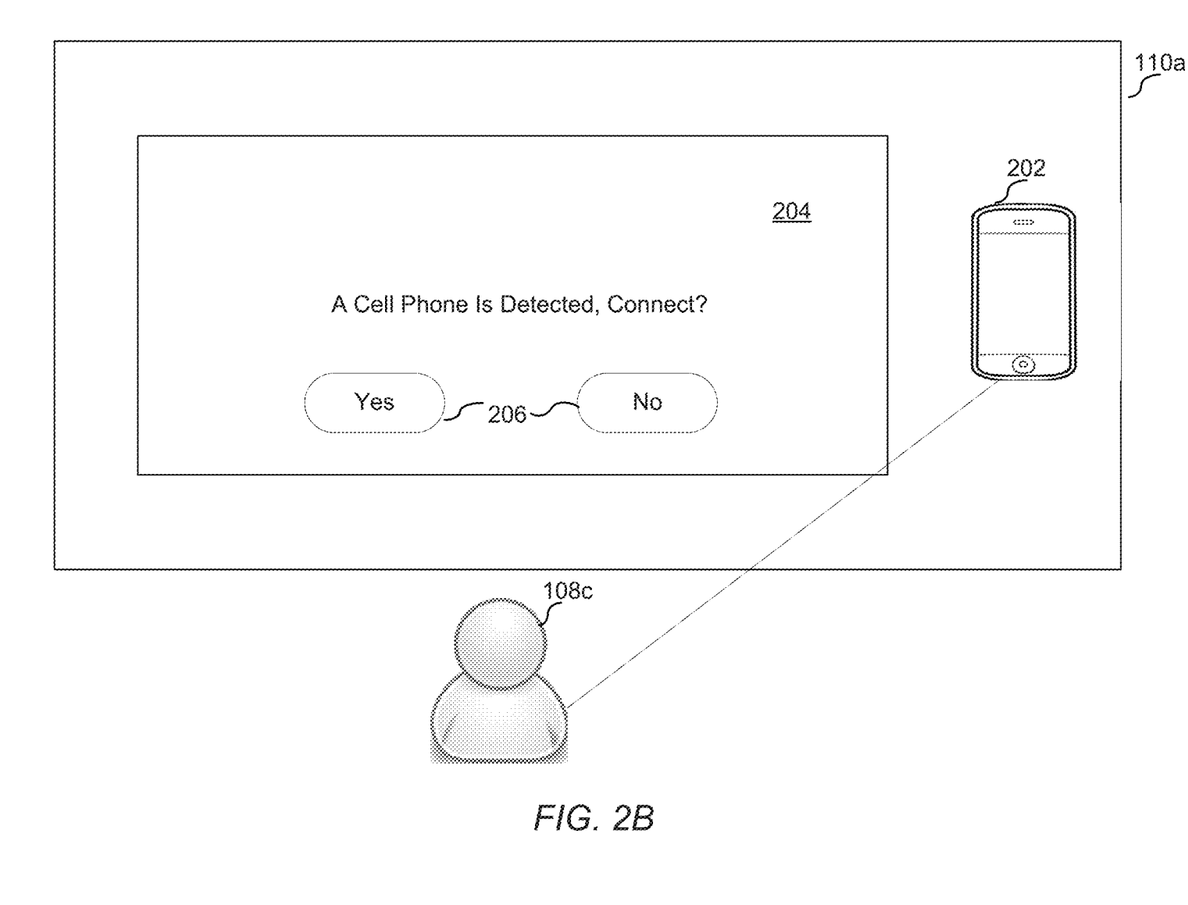
FIG. 2B illustrates that the user portable device may be connected to the passenger display wiredly in some other embodiments.

FIGS. 2A-B illustrate two examples of connecting the user portable device associated with the passenger to the passenger display 110 in accordance with the disclosure. In FIG. 2A, the portable device 202 associated with passenger 108c may be connected with the passenger display 110a wirelessly via a Bluetooth connection, NFC communication or a WiFi connection. As shown, an interface 204 may be provided through the passenger display 204 to notify the user that the user portable device 202 is detected as being within a connectable range. In some embodiments, the passenger display 110a may be equipped with a wireless communication module to communicate with the portable device 202 on its own. For example, the passenger display 110a may include a computer with a processing power as well as a LCD screen. However, this is not necessarily the only case. In some embodiments, the portable device 202 may be connected to passenger display 110a via a communication unit of the driving apparatus 100. In those embodiments, the driving apparatus 100 may comprise a vehicle control unit (VCU) configured to control communications between a detected portable device 202 and the passenger display 110a. In any case, as shown, the interface 204 may be configured to facilitate the passenger 108c to connect the portable device 202 via controls 206 as shown.

FIG. 2B illustrates that the user portable device 202 may be connected to the passenger display 110 wiredly in some embodiments. For example, an embedded bracket may be provided on the display 110a so that passenger 108c may insert the portable device 202 into the bracket. One or more connectors that can connect the portable device 202 may be provided on bracket in that example. The portable device 202 may include a smart phone, a tablet device, a laptop, a netbook, and/or any other type of portable device associated with passenger 108c.

It should be understood that other ways of connecting the portable device 202 to the passenger display 110a are contemplated. For example, it is contemplated that the portable device 202 can be connected to the passenger display 110a via a cable and the passenger associated with the portable device 202 may hold the portable device 202 or leave the portable device 202 on a surface in the driving apparatus 100 that is not specifically designed to hold the portable device 202.

Figure 3:
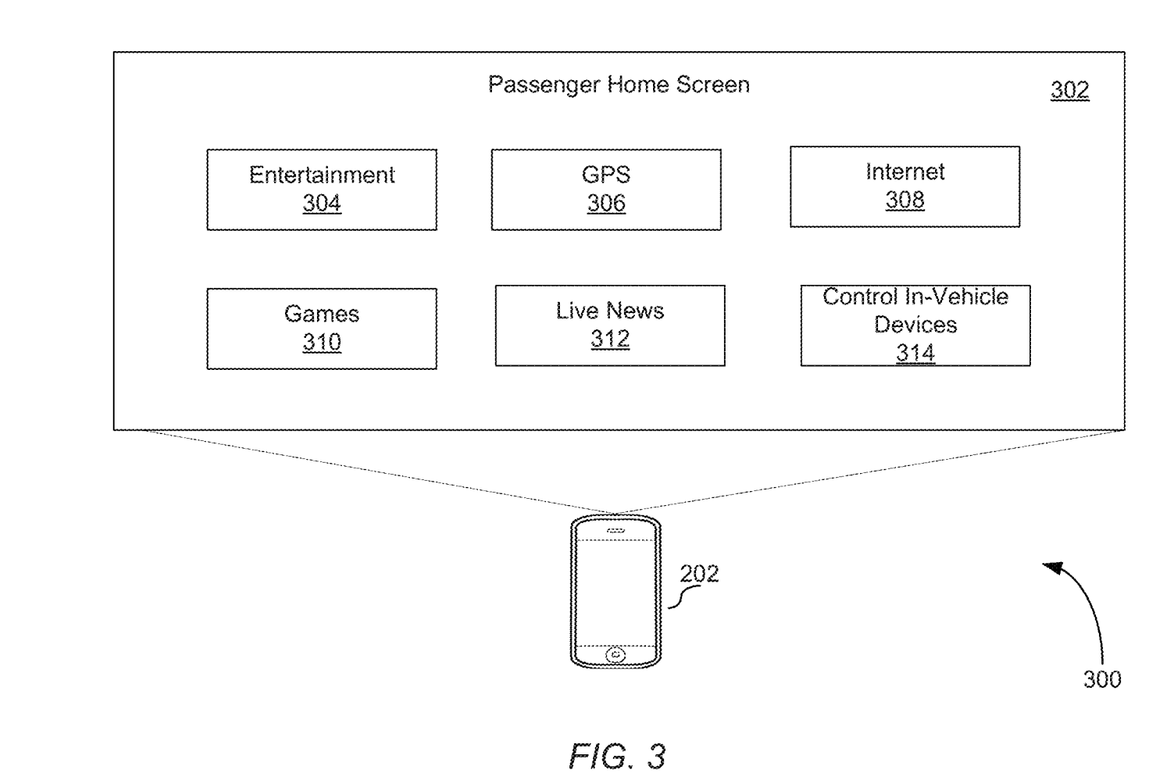
FIG. 3 illustrates an exemplary interface that can be provided on a user portable device that is connected to the passenger display in accordance with the disclosure.

Attention is now directed to FIG. 3, which illustrates an exemplary interface that can be provided on a user portable device that is connected to the passenger display in accordance with the disclosure. It will be described with reference to FIGS. 1-2. As mentioned, in accordance with the disclosure, the user portable device associated with the passenger 108c can be configured with an application that is configured to enable the passenger 108c to control content displaying on the passenger display 110a and/or various in-vehicle devices mentioned above. FIG. 3 generally illustrates an interface 300 can be provided on the user portable device 202. As shown, the user interface 300 may include a passenger home screen 302 such as the passenger home screen 302 may be automatically shown on the user portable device 202 after the user portable device 202 is connected to the passenger display 110a and/or the VCU. As shown, the passenger home screen 302 may include one or more field controls that may be configured to enable the passenger 108c to perform various functions. For example, as shown in this example, a button or icon 304 may be provided on the passenger home screen 302 to enable the user to play media content stored on the user portable device 202 or on a server of a third party content provider (e.g., such as an online media content provider) on the passenger display 110a.

The button 306 may be provided to enable the passenger 108c to bring up a GPS map on the passenger display 110a. The GPS map may be a part of a GPS application that is running on the user portable device 202. For example, a GPS app on the user portable device 202 can be run on the user portable device 202 and the GPS map can be displayed on the passenger display 110a after the passenger 108c pushes the button 306.

The button 308 may be provided to enable the passenger 108c to bring up an Internet browser interface on the passenger display 110. The Internet browser may be an application that is running on the user portable device 202. The interface of the internet browser may be shown on the passenger display 110a after the passenger 108 pushes button 308.

The button 310 may be provided to enable the passenger 108c to bring up one or more game interfaces on the passenger display 110a. The one or more games may be installed on the user portable device 202. After the passenger 108c pushes the button 310, icons representing those games may be displayed on the passenger display 110a. The passenger 108c may select one of those games to engage in interactive plays. For example, the passenger 108c may control a character in the game through the user portable device 202 while the game interface showing the virtual environment of the game.

The button 312 may be provided to enable the passenger 108c to bring up a screen to the passenger display 110a to view live news. For example, after the passenger 108c pushes the button 312, live news feed may be received by the user portable device 202 and may be cast to the passenger 108c for presentation. The live news feed may include textual, multimedia and/or audio news feed.

The button 314 may be provided to enable the passenger 108c to bring up a screen to the passenger display 110a to control various in-vehicle devices that can be controlled by the passenger 108c. After the passenger 108c pushes the button 314, an interface with icons representing various in-vehicle devices can displayed. Such devices may include, but not limited to, air conditioning system, passenger seat, one or more passenger lights, the audio system, and/or any other in-vehicle devices. For example, the air conditioning system may be controlled by passenger 108c. To enable the passenger 108c to control the air conditioning system, the passenger display 110a may display visual dials to enable passenger 108c to adjust the temperature, wind direction, humidity and/or any other aspects of the air conditioning system.

Figure 4:
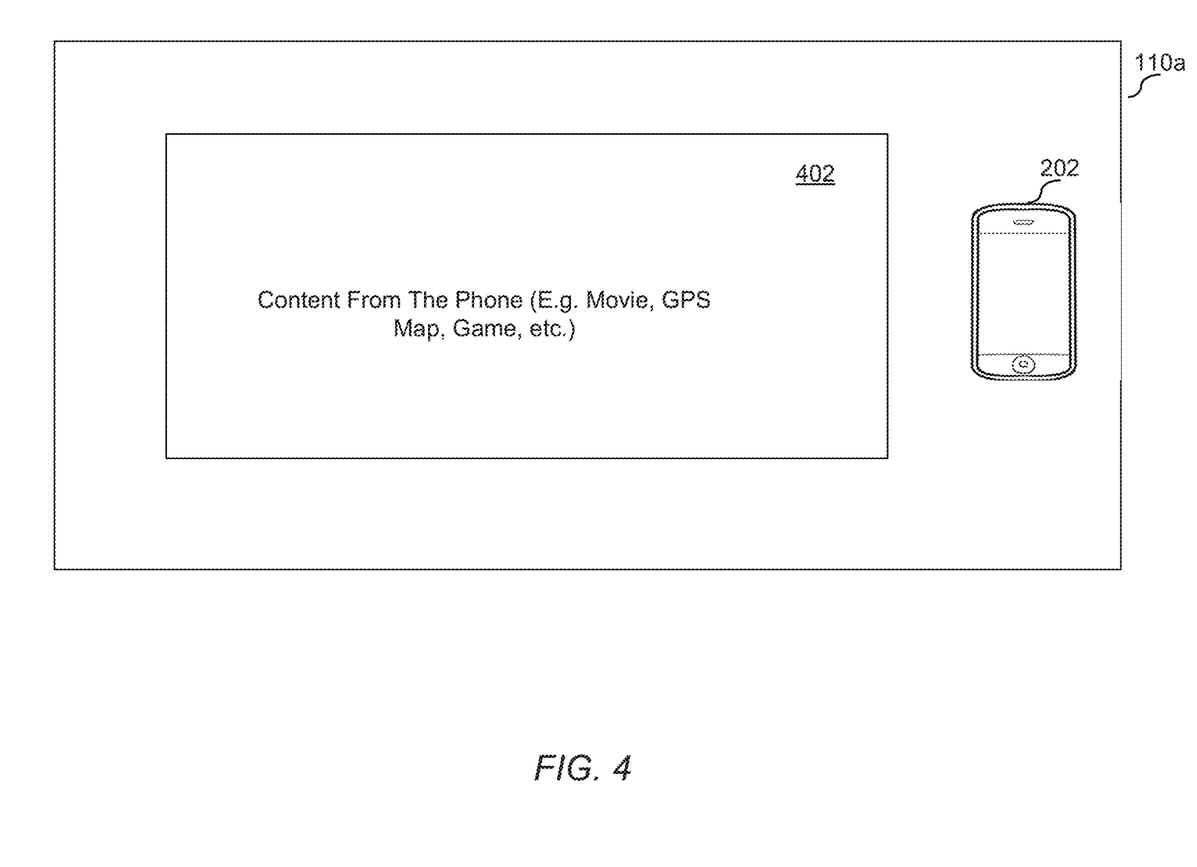
FIG. 4 illustrates the content from the portable device can be displayed in a screen 402 on the passenger display.

In some embodiments, after the passenger 108c selects a type of content or controls to be displayed on the passenger display 110a through the interface 302, the passenger display 110a may be configured to provide an interface to ask the passenger 108c to confirm he/she wants to have the content from the portable device 202 to be displayed on the passenger display 110a. FIG. 4 illustrates that the content from the portable device 202 can be displayed in a screen 402 on the passenger display 110a after the user selects the content and confirms that he/she wants to display the content on passenger display 110a.

It should be understood that in some other embodiments, the passenger home screen 302 show in FIG. 3 may be presented on the passenger display 110a after the user portable device 202 is connected. That is, in those embodiments, the passenger display 110a may be used to enable the user to control and/or use applications installed on the user portable device 202 by displaying the interface 302 show on the passenger display 110a.

Figure 5:
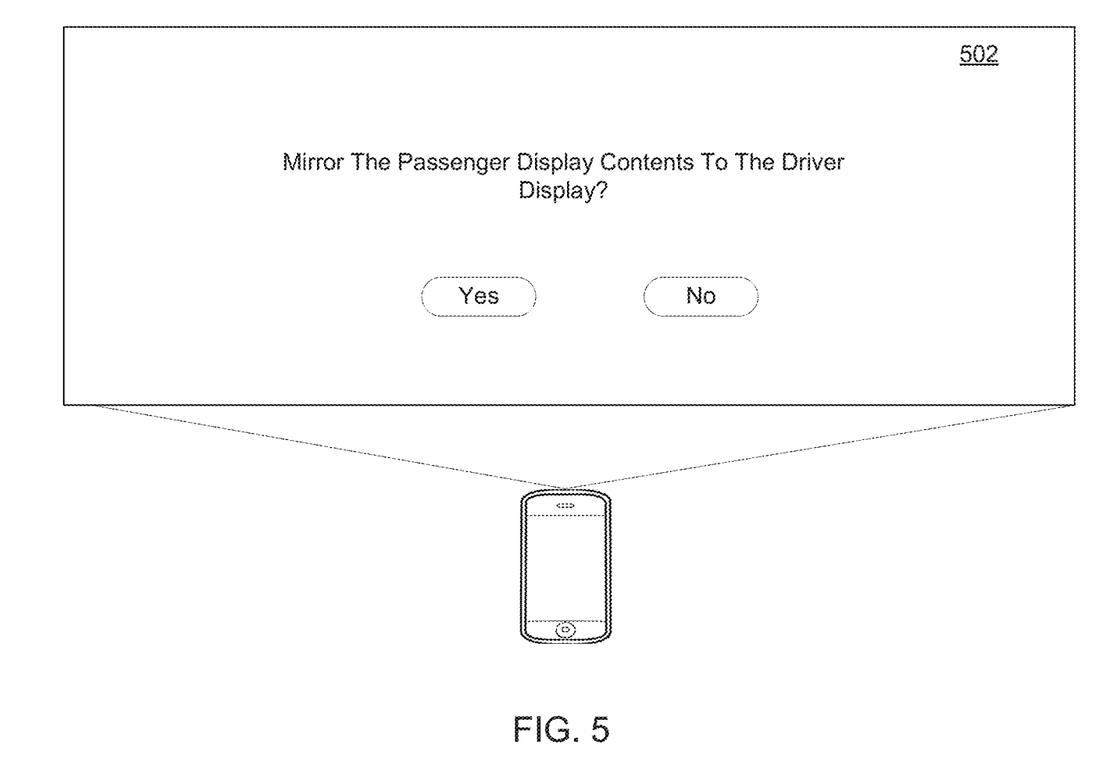
FIG. 5 illustrates an interface may be provided on the passenger display or the user portable device to enable a passenger to mirror the contents displayed on the passenger display to a driver display.

In some embodiments, an interface may be provided on the passenger display 110a or the user portable device 202 to enable the messenger 108c to mirror the contents displayed on the passenger display 110a to a driver display such as the display 103 shown in FIG. 1. For example, FIG. 5 illustrates an interface 502 may be provided on the passenger display 110a or the user portable device 202 to enable the passenger 108c to mirror the contents displayed on the passenger display 110a to a driver display. For instance, the passenger 108c may be enabled to mirror the GPS map (provided by a GPS app on the user portable device 202) displayed on passenger display 110a to the driver display 103 to show routing information regarding the driving apparatus 100. As another example, the passenger 108c may be enabled to mirror a movie content (provided by a movie app on the user portable device 202) displayed on passenger display 110a to the driver display 103 briefly because the movie content may be of interest to the driver.

Figure 6:
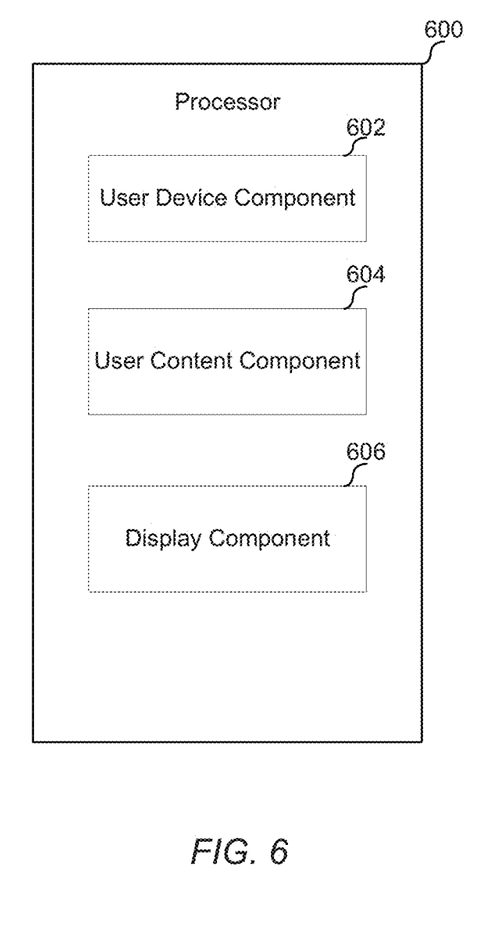
FIG. 6 illustrates a processor that may be provided by the driving apparatus for displaying content from a user portable device on a passenger display in accordance with the disclosure.

Attention is now directed to FIG. 6 that illustrates a processor that may be provided by the driving apparatus 100 for displaying content from a user portable device on a passenger display in accordance with the disclosure. In some embodiments, the processor 600 shown in FIG. 6 may be a VCU of the driving apparatus 100. In some other embodiments, the processor 600 may be embedded in the passenger display 110a. In any case, the processor 600 may be configured to execute program components, which may include a user device component 602, a user content component 604, a display component 606, and/or any other components.

The user device component 602 may be configured to connect user portable devices associated with passengers of driving apparatus 100 and/or manage the connected user portable devices. As described and illustrated herein, the portable device associated with passenger 108c may be connected with the passenger display 110a wirelessly via a Bluetooth connection, NFC communication or a WiFi connection. In some embodiments, the user device component 602 may be configured to provide an interface, such as the interface 204, to notify the user that the user portable device 202 is detected as being within a connectable range. The user portable device that can be connected and/or managed by the user device component 602 may include a smart phone, a tablet device, a laptop, a netbook, and/or any other type of portable device associated with the passengers.

The user content component 604 may be configured to enable a passenger of the driving apparatus 100 to display contents on his/her portable device that is connected to a passenger display via the user device component 602. In some embodiments, the user content component 604 can be configured to provide an interface such as the interface 302 shown in FIG. 3 ton enable the passenger to select a type of content on the user portable device to be displayed on the passenger display. In some embodiments, after the passenger selects a type of content or controls to be displayed on the passenger display through the interface 302, the passenger display 110a may be configured to provide an interface to ask the passenger to confirm he/she wants to have the content from the portable device to be displayed on the passenger display.

The display component 606 may be configured to facilitate the display of the content on the user portable device as selected by the passenger to be displayed on the passenger display. In some embodiments, the display component can be configured to enable the passenger to mirror the content displayed on the passenger display to a driver display as described and illustrated herein.

Figure 7:
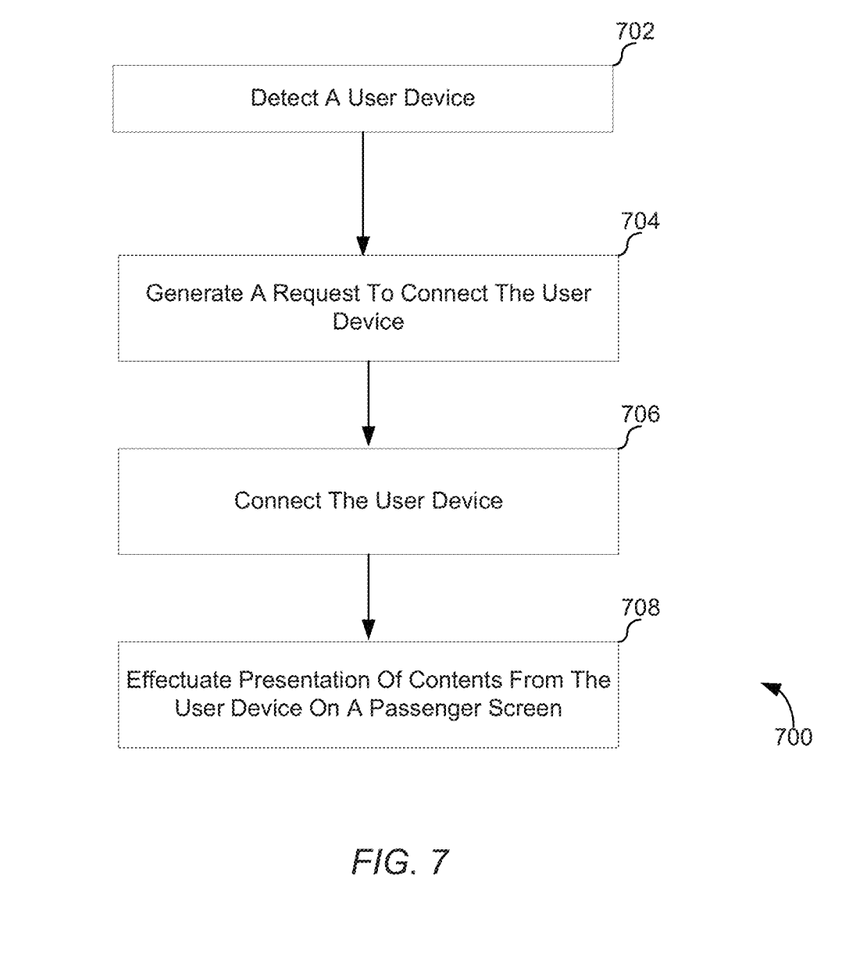
FIG. 7 illustrates an exemplary method for enabling a passenger of the driving apparatus to display content from a user portable device associated with the passenger on a passenger display provided by the driving apparatus.

Attention is now is directed to FIG. 7 which illustrates an exemplary method 700 for enabling a passenger of the driving apparatus 100 to display content from a user portable device associated with the passenger on a passenger display provided by the driving apparatus. The particular series of processing steps depicted in FIG. 7 is not intended to be limiting. It is appreciated that the processing steps may be performed in an order different from that depicted in FIG. 7 and that not all the steps depicted in FIG. 7 need be performed. In certain implementations, the method 700 may be implemented by a computer system, such as the computer system shown in FIG. 5.

In some embodiments, the method depicted in method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At 702, a user portable device can be detected. In some implementations, operations involved in 702 can be implemented by a user device component the same as or substantially similar to user device component 604 described and illustrated herein.

At 704, a request can be generated to connect the user portable device detected at 702. For example, the request generated at 704 may include information regarding a portable number or a channel number through which the user portable device 202 can be connected to the passenger display. In some implementations, operations involved in 704 can be implemented by a user device component the same as or substantially similar to user device component 604 described and illustrated herein.

At 706, the user portable device detected at 706 can be connected to the passenger display. As described and illustrated herein, the portable device may be connected with the passenger display wirelessly via a Bluetooth connection, NFC communication or a WiFi connection. In some implementations, operations involved in 706 can be implemented by a user device component the same as or substantially similar to user device component 604 described and illustrated herein.

At 708, contents on the user portable device that is connected 706 can be displayed on the passenger display. In some implementations, operations involved in 708 can be implemented by a display component the same as or substantially similar to a display component 608 described and illustrated herein.

Figure 8:
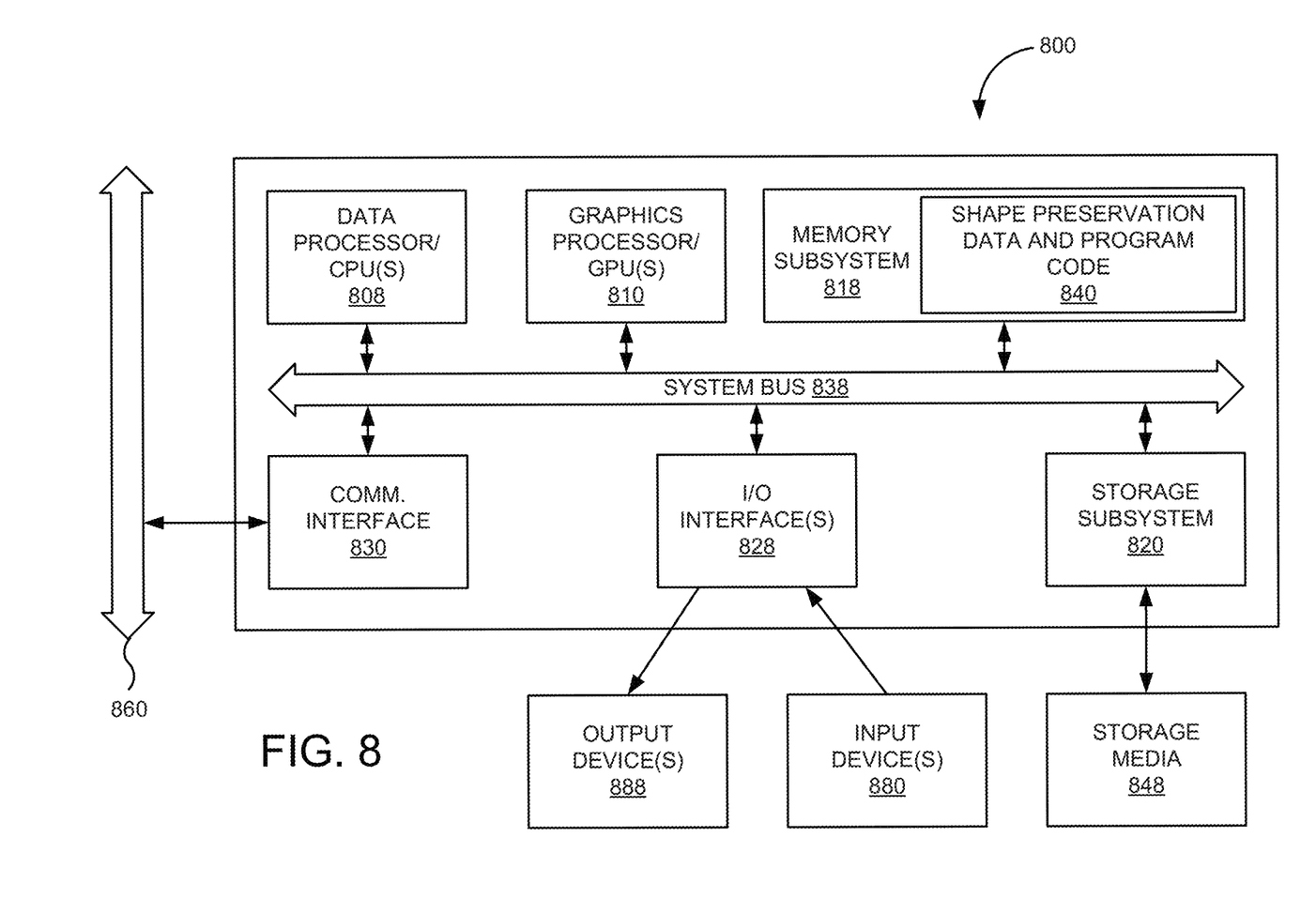
FIG. 8 illustrates a simplified computer system that can be used implement various embodiments described and illustrated herein.

FIG. 8 illustrates a simplified computer system that can be used implement various embodiments described and illustrated herein. A computer system 800 as illustrated in FIG. 8 may be incorporated into devices such as a portable electronic device, mobile phone, or other device as described herein. FIG. 8 provides a schematic illustration of one embodiment of a computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 808, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 818, which can include without limitation a mouse, a keyboard, a camera, and/or the like; and one or more output devices 820, which can include without limitation a display device, a printer, and/or the like.

The computer system 800 may further include and/or be in communication with one or more non-transitory storage devices 828, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 830 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 830. In other embodiments, a portable electronic device, e.g. the first electronic device, may be incorporated into the computer system 800, e.g., an electronic device as an input device 818. In some embodiments, the computer system 800 will further comprise a working memory 838, which can include a RAM or ROM device, as described above.

The computer system 800 also can include software elements, shown as being currently located within the working memory 838, including an operating system 840, device drivers, executable libraries, and/or other code, such as one or more application programs 848, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 8, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 828 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 800 to perform methods in accordance with various embodiments of the technology. According to a set of embodiments, some or all of the procedures of such methods are performed by the computer system 800 in response to processor 810 executing one or more sequences of one or more instructions, which might be incorporated into the operating system 840 and/or other code, such as an application program 848, contained in the working memory 838. Such instructions may be read into the working memory 838 from another computer-readable medium, such as one or more of the storage device(s) 828. Merely by way of example, execution of the sequences of instructions contained in the working memory 838 might cause the processor(s) 810 to perform one or more procedures of the methods described herein.

Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 828. Volatile media include, without limitation, dynamic memory, such as the working memory 838.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 and/or components thereof generally will receive signals, and the bus 808 then might carry the signals and/or the data, instructions, etc. carried by the signals to the working memory 838, from which the processor(s) 810 retrieves and executes the instructions. The instructions received by the working memory 838 may optionally be stored on a non-transitory storage device 828 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A system for connecting a user portable device to a passenger display provided to a passenger of a driving apparatus, the system comprising one or more of a processor configured to execute machine-readable instructions such that when the machine-readable instructions are executed to cause the one or more processors to perform:
   detecting the user portable device is present within the driving apparatus;
   in response to the detection that the user portable device is within the driving apparatus, generating a request to connect the user portable device to the passenger display;
   connecting the user portable device to the passenger display after the request is accepted by the user portable device;
   providing an passenger interface on the passenger display, the passenger interface being configured to enable the passenger to control one or more devices within the driving apparatus after the user portable device is connected to the passenger display and the passenger interface being configured to enable the user to select one or more general types of contents for display on the passenger interface;
   receiving an control instruction provided by the passenger through the passenger interface, the control instruction being for controlling a device within the driving apparatus;
   transmitting the control instruction for controlling the device within the driving apparatus to the portable device;
   effectuating an execution of the control instruction at the portable device;
   receiving, from the passenger interface, a user selection of a content for display on the passenger interface;
   determining the selected content is to be provided by the portable device;
   requesting the portable device to provide the selected content;
   receiving the selected content from the portable device;
   providing an interface on the passenger display;
   receive an user input from the interface to mirror the selected content currently being displayed on the passenger display to a display for a driver of the driving apparatus; and
   mirror the selected content currently being displayed on the passenger display to the display for a driver of the driving apparatus according to the user input.

2. The system of claim 1, wherein the device within the driving apparatus includes an air-conditioning system, a seat, a passenger lamp, or an audio system.

3. The system of claim 1, wherein the user portable device includes a smart phone, a tablet, or a laptop.

4. The system of claim 2, wherein the user portable device is connected to the passenger display wireless via a Bluetooth connection.

5. The system of claim 1, wherein the one or more processors are further configured to perform: providing the passenger interface on the user portable device after the user portable device is connected to the passenger display.

6. The system of claim 1, wherein the one or more processors are further configured to perform: receiving an instruction from the interface to mirror the selected contents displayed on the passenger display to the display for the driver of the driving apparatus and effectuating the mirroring in response to the instruction being received.

7. The system of claim 1, wherein the passenger display is a first passenger display provided for a passenger and wherein a second passenger display is provided in the driving apparatus for a second passenger, and wherein the processor is further configured to perform connecting a user portable device associated with the second passenger to the second passenger display.

8. The system of claim 1, wherein the passenger display includes a light-emitting diode display.

9. A method for connecting a user portable device to a passenger display provided to a passenger of a driving apparatus, the method being implemented by one or more of a processor configured to execute machine-readable instructions, the method comprising:
   detecting the user portable device is present within the driving apparatus;
   in response to the detection that the user portable device is within the driving apparatus, generating a request to connect the user portable device to the passenger display;
   connecting the user portable device to the passenger display after the request is accepted by the user portable device;
   providing an passenger interface on the passenger display, the passenger interface being configured to enable the passenger to control one or more devices within the driving apparatus after the user portable device is connected to the passenger display and the passenger interface being configured to enable the user to select one or more general types of contents for display on the passenger interface;

receiving an control instruction provided by the passenger through the passenger interface, the control instruction being for controlling a device within the driving apparatus;

transmitting the control instruction for controlling the device within the driving apparatus to the portable device;

effectuating an execution of the control instruction at the portable device;

receiving, from the passenger interface, a user selection of a content for display on the passenger interface;

determining the selected content is to be provided by the portable device;

requesting the portable device to provide the selected content;

receiving the selected content from the portable device;

providing an interface on the passenger display;

receiving an user input from the interface to mirror the selected content currently being displayed on the passenger display to a display for a driver of the driving apparatus; and mirroring the selected content currently being displayed on the passenger display to the display for a driver of the driving apparatus according to the user input.

10. The method of claim 9, wherein the device within the driving apparatus includes an air-conditioning method, a seat, a passenger lamp, or an audio method.

11. The method of claim 9, wherein the user portable device includes a smart phone, a tablet, or a laptop.

12. The method of claim 9, wherein the user portable device is connected to the passenger display wireless via a Bluetooth connection.

13. The method of claim 9, wherein the method further comprising: proving the passenger interface on the user portable device after the user portable device is connected to the passenger display.

14. The method of claim 9, wherein the method further comprises: receiving an instruction from the interface to mirror the selected contents displayed on the passenger display to the display for the driver of the driving apparatus and effectuating the mirroring in response to the instruction being received.

15. The method of claim 9, wherein the passenger display is a first passenger display provided for a passenger and wherein a second passenger is provided in the driving apparatus for a second passenger, and wherein the method further comprises connecting a user portable device associated with the second passenger to the second passenger display.

16. The method of claim 9, wherein the passenger display includes a light-emitting diode display.

* * * * *